US012741915B2

(12) United States Patent
Peng et al.

(10) Patent No.: US 12,741,915 B2
(45) Date of Patent: Sep. 22, 2026

(54) EMULSION IN WATER FOR PREVENTING AND TREATING YELLOW SHOOT OF CITRUS FRUIT TREE, PREPARATION METHOD AND APPLICATION METHOD

(71) Applicant: ZHUHAI RUNNONG SCIENCE AND TECHNOLOGY CO. LTD, Zhuhai (CN)

(72) Inventors: Xiaoming Peng, Zhuhai (CN); Dianxian Cai, Zhuhai (CN)

(73) Assignee: ZHUHAI RUNNONG SCIENCE AND TECHNOLOGY CO. LTD, Zhuhai (CN)

(*) Notice: Subject to any disclaimer, the term of this patent is extended or adjusted under 35 U.S.C. 154(b) by 787 days.

(21) Appl. No.: 18/049,647

(22) Filed: Oct. 26, 2022

(65) Prior Publication Data

US 2023/0078125 A1 Mar. 16, 2023

Related U.S. Application Data

(63) Continuation-in-part of application No. PCT/CN2020/089891, filed on May 13, 2020.

(30) Foreign Application Priority Data

Apr. 30, 2020 (CN) ......................... 202010365242.6

(51) Int. Cl.

| | |
|---|---|
| ***C05G 3/60*** | (2020.01) |
| ***A01N 25/00*** | (2006.01) |
| ***A01N 25/02*** | (2006.01) |
| ***A01N 25/04*** | (2006.01) |
| ***A01N 31/02*** | (2006.01) |
| ***A01N 43/16*** | (2006.01) |
| ***A01N 43/90*** | (2006.01) |
| ***A01N 65/14*** | (2009.01) |
| ***A01N 65/16*** | (2009.01) |
| ***A01N 65/26*** | (2009.01) |
| ***A01P 1/00*** | (2006.01) |
| ***C05C 11/00*** | (2006.01) |
| ***C05F 11/02*** | (2006.01) |
| ***C05F 11/10*** | (2006.01) |
| ***C05G 3/00*** | (2020.01) |
| ***C05G 3/50*** | (2020.01) |
| ***C05G 5/27*** | (2020.01) |

(52) U.S. Cl.

CPC ............... *C05G 3/50* (2020.02); *A01N 25/00* (2013.01); *A01N 25/02* (2013.01); *A01N 25/04* (2013.01); *A01N 31/02* (2013.01); *A01N 43/16* (2013.01); *A01N 43/90* (2013.01); *A01N 65/14* (2013.01); *A01N 65/16* (2013.01); *A01N 65/26* (2013.01); *A01P 1/00* (2021.08); *C05C 11/00* (2013.01); *C05F 11/02* (2013.01); *C05F 11/10* (2013.01); *C05G 3/00* (2013.01); *C05G 3/60* (2020.02); *C05G 5/27* (2020.02); *Y02A 50/30* (2018.01)

(58) Field of Classification Search

CPC ... C05G 3/50; C05G 3/60; C05G 5/27; C05G 3/00; A01N 25/04; A01N 31/02; A01N 43/16; A01N 43/90; A01N 25/02; A01N 25/00; A01N 65/14; A01N 65/16; A01N 65/26; A01N 65/08; C05C 11/00; C05F 11/02; C05F 11/10; Y02A 50/30; A01P 1/00

See application file for complete search history.

(56) References Cited

FOREIGN PATENT DOCUMENTS

| | | | | |
|---|---|---|---|---|
| CN | 102484992 | A | * | 6/2012 |
| CN | 104823626 | A | | 8/2015 |
| CN | 105994415 | A | * | 10/2016 |
| CN | 109769550 | A | | 5/2019 |
| CN | 109924057 | A | | 6/2019 |

OTHER PUBLICATIONS

Peng et al. (CN109924057A), Method for controlling diffusion of citrus huanglongbing with photosynthetic high fat film agent, Jun. 25, 2019, Espacenet, English Translation, 6 pages. (Year: 2019).*
Yang, et al. (CN104823626A), Agricultural ecological technique capable of preventing and controlling liberobacter asiaticum as well as harvesting organic oranges, Aug. 12, 2015, Espacenet, English Translation, 9 pages. (Year: 2015).*
Xu, et al., Synergistic Pesticide Composition of Azadirachtin and Tea Saponin, CN102484992A, 2012, English Translation, 5 pages. (Year: 2012).*
Wenxiu Ma et al., Citrus Huanglongbing is a pathogen-triggered immune disease that can be mitigated with antioxidants and gibberellin, Nature Communications, Jan. 26, 2022, pp. 1-13, vol. 13, No. 529.
International Search Report of PCT Patent Application No. PCT/CN2020/089891 issued on Dec. 1, 2020.

* cited by examiner

*Primary Examiner* — Ali Soroush
*Assistant Examiner* — Andriae M Holt

(57) ABSTRACT

Provided is an emulsion in water for preventing and treating a yellow shoot of a citrus fruit tree, and it is composed of the following components according to the weight ratio: 100-300 parts of a dodecanol, 2-150 parts of a hexadecanol, 1-100 parts of a bactericidal insecticide, 5-150 parts of a plant nutrient, 5-10 parts of an emulsifier, 4-6 parts of a co-emulsifier, 40 parts of a thickener, and 500-800 parts of water. The emulsion in water for preventing and treating the yellow shoot of the citrus fruit tree, the preparation method and the application method provided by the present invention may achieve the following technical effects: the main propagation path of the citrus yellow shoot is cut off, the spread of the yellow shoot is prevented, pathogenic bacteria of the yellow shoot of the fruit tree are killed, and the vitality of a diseased tree is restored.

7 Claims, No Drawings

EMULSION IN WATER FOR PREVENTING AND TREATING YELLOW SHOOT OF CITRUS FRUIT TREE, PREPARATION METHOD AND APPLICATION METHOD

CROSS-REFERENCE TO RELATED APPLICATIONS

The present application is a continuation-in-part application of PCT application No. PCT/CN2020/089891 filed on May 13, 2020, which claims the benefit of Chinese Patent Application No. 202010365242.6 filed on Apr. 30, 2020, each of which is incorporated by reference herein in its entirety.

TECHNICAL FIELD

The present invention relates to an emulsion in water for preventing and treating a yellow shoot of a citrus fruit tree, a preparation method and an application method.

BACKGROUND

"Yellow shoot" of citrus fruit trees is one of destructive diseases in the citrus production in the world, and it is caused by gram-negative like bacteria (belonging to phloem bacilli) that parasitize in a phloem of the fruit tree. Seedlings and young trees die within 1-2 years after the onset of the disease, and adult trees lose the fruiting ability within 3-5 years after the onset of the disease.

The "yellow shoot" of the citrus fruit trees is widely distributed in nearly 50 countries and regions in the world. With the climate warming, the distribution area of vector insects of the yellow shoot is gradually expanded. At the same time, the world resource exchange is gradually frequent, so that the harm of the yellow shoot is increasingly serious. The occurrence of this disease leads to a large area of yield reduction, quality deterioration and even death, huge losses are brought to the citrus economy, and the healthy development of the citrus industry is seriously affected.

The yellow shoot may cause a systematic disease to the whole citrus plant, pathogens may be found in roots, trunks, branches, leaves, flowers and fruits, especially in the roots, a pesticide is very difficult to reach. Now, good method and way of administration are not found yet, and a specific pesticide is also not developed. At present, prevention and treatment methods mainly include a strict quarantine system, elimination of artificial propagation of diseased seedlings, cultivation of disease-free seedlings, microbial control, prevention and treatment of a pathogen propagation vector-citrus psylla and other methods. However, the use processes of these methods all have its own limitation factors, and there are loopholes in the prevention and treatment, so that the citrus yellow shoot occurs in large areas in different regions every year.

The patent application of Peng Xiaoming and Qiu Qingjun, the same inventors of the present application, published on Jun. 25, 2019, with the publication number of CN109924057A, discloses a method of preventing and controlling spread of citrus yellow shoot by using a photosynthetic high-fat film agent, which may better control the spread of the yellow shoot, but may not cure yellow shoot radically.

On Jan. 26, 2022, an online long form of the Nature Communications magazine publishes a research article, entitled "Citrus Huanglongbing is a pathogen-triggered immune disease that can be mitigated with antioxidants and gibberellin", of the Nian Wang research group of the University of Florida, USA. This research proposes that the symptoms of the citrus yellow shoot are not directly caused by a pathogenic factor produced by pathogenic Candidatus Liberibacter asiaticus (CLAs), but are caused by an autoimmune reaction of a plant stimulated by the pathogenic CLAs. It is the first time to confirm that the citrus yellow shoot is an immune disease triggered by pathogens, and this is an important progress in research on the pathogenesis of the citrus yellow shoot.

SUMMARY

A technical problem to be solved by the present invention is to provide an emulsion in water for effectively preventing and treating a yellow shoot of a citrus fruit tree.

The present invention provides an emulsion in water for preventing and treating a yellow shoot of a citrus fruit tree, and it is composed of the following components according to the weight ratio: 100-300 parts of a dodecanol, 2-150 parts of a hexadecanol, 1-100 parts of a bactericidal insecticide, 5-150 parts of a plant nutrient, 5-10 parts of an emulsifier, 4-6 parts of a co-emulsifier, 40 parts of a thickener, and 500-800 parts of water.

The emulsion in water for preventing and treating the citrus yellow shoot provided in the present application contains the "higher fatty alcohol, bactericidal insecticide, and plant nutrient". The function of the higher fatty alcohol is to fully and comprehensively induce the fruit tree to produce physiological and biochemical effects, and improve the own immunity of the fruit tree; the function of the bactericidal insecticide is to kill pathogenic bacteria; and the function of the plant nutrient is to increase the nutrition of the fruit tree, and supplement the energy consumed by the fruit tree in order to improve the immunity and kill the pathogenic bacteria.

Further, the emulsion in water for preventing and treating the yellow shoot of the citrus fruit tree is composed of the following components according to the weight ratio: 150-250 parts of the dodecanol, 30-80 parts of the hexadecanol, 10-50 parts of the bactericidal insecticide, 20-80 parts of the plant nutrient, 5-10 parts of the emulsifier, 4-6 parts of the co-emulsifier, 40 parts of the thickener, and 500-800 parts of the water.

Further, the bactericidal insecticide is one or a mixture of more of a tea saponin, an azadirachtin, a toosendanin, a matrine, a celangulin and a stemonine.

Further, the plant nutrient is one or a mixture of two of an amino acid containing water-soluble fertilizer and a humic acid containing water-soluble fertilizer.

Further, the emulsifier is a non-ionic surfactant, and the non-ionic surfactant is one or a mixture of more of the tea saponin, a high-carbon fatty alcohol polyoxyethylene ether, a fatty acid polyoxyethylene ester and a dehydrated sorbitol ester.

Further, the co-emulsifier is an n-butanol or a propylene glycol.

Further, the thickener is one or a mixture of more of an arabic gum, a methyl cellulose, an xanthan gum, a white carbon black, an attapulgite and a bentonite.

The present invention further provides a preparation method for the above emulsion in water for preventing and treating the yellow shoot of the citrus fruit tree, including the following steps: putting the dodecanol and the hexadecanol into a container and heating to melt at 60-70° C., then adding the emulsifier and the co-emulsifier into the container, treating by a high shear homogenizer at a rotation speed of 5000 revolutions per minute (rpm), rotating for 10 minutes, and adding 60-70° C. of water into the container, treating by the high shear homogenizer at a rotation speed of 10000 rpm, rotating for 10 minutes, cooling to 40° C., then adding the thickener, the bactericidal insecticide, and the plant nutrient into the container, treating by the high shear homogenizer at the rotation speed of 10000 rpm, and rotating for 30-40 minutes, to obtain the emulsion in water.

The present invention further provides an application method of the above emulsion in water for preventing and treating the yellow shoot of the citrus fruit tree, after the emulsion in water is diluted by 300 times with the water, it is sprayed on a whole fruit tree plant, and at the same time, the emulsion in water is sprayed on a root of the fruit tree after being diluted by 300 times.

Preferably, after the emulsion in water in which the plant nutrient is the amino acid containing water-soluble fertilizer is diluted by 300 times with the water, it is sprayed on the whole fruit tree plant; and after the emulsion in water in which the plant nutrient is the humic acid containing water-soluble fertilizer is diluted by 300 times with the water, it is sprayed on the root of the fruit tree.

The emulsion in water for preventing and treating the yellow shoot of the citrus fruit tree, the preparation method and the application method provided by the present invention may be used to achieve the following technical effects: the main propagation path of the citrus yellow shoot is cut off, the spread of the yellow shoot is prevented, pathogenic bacteria of the yellow shoot of the fruit tree are killed, and the vitality of a diseased tree is restored. It is specifically achieved by the following ways: 1. The emulsion in water is prepared by the higher fatty alcohol, the bactericidal insecticide and the plant nutrient according to a certain process, this emulsion in water is sprayed on the fruit tree after being diluted by 300 times, a film may be formed on the surface of the whole fruit tree, and this film has good prevention and treatment effects on most fungal diseases, insect pests and eggs and the like, and may effectively kill citrus psylla, and cut off the main propagation path of the yellow shoot; and the bactericidal insecticide in the emulsion in water may kill the pathogenic bacteria of the yellow shoot in the plant, and the plant nutrient may supplement the nutrition of the plant, and restore the vitality of the plant. 2. This emulsion in water is sprayed on the root of fruit tree after being diluted by 300 times, a film may be formed on the surface of the root of the fruit tree and nearby soil particles, the pathogenic bacteria of the yellow shoot in the root may be effectively killed, and the plant nutrient may supplement the nutrition needed for the root recovery of the fruit tree, and accelerate the root recovery of the diseased tree.

DETAILED DESCRIPTION OF THE EMBODIMENTS

Embodiment 1

This embodiment provides an emulsion in water for preventing and treating a yellow shoot of a citrus fruit tree, and it is composed of the following components according to the weight ratio: 200 parts of a dodecanol, 50 parts of a hexadecanol, 30 parts of a bactericidal insecticide, 40 parts of a plant nutrient, 6 parts of an emulsifier, 5 parts of a co-emulsifier, 40 parts of a thickener, and 700 parts of water.

In this embodiment, the bactericidal insecticide is a mixture of tea saponin and azadirachtin, herein the weight ratio of the tea saponin and the azadirachtin is 10:1. The plant nutrient is an amino acid containing water-soluble fertilizer, and the amino acid containing water-soluble fertilizer is a commercially available product. For example, in this embodiment, the amino acid containing water-soluble fertilizer produced by Zhuhai Runnong Science and Technology Co., Ltd. (agricultural fertilizer (2018) No. 12476) is used. The emulsifier is a fatty acid polyoxyethylene ester. The co-emulsifier is an n-butanol. The thickener is a methyl cellulose.

This embodiment further provides a preparation method for the emulsion in water for preventing and treating the yellow shoot of the citrus fruit tree, including the following steps: putting the dodecanol and the hexadecanol into a container and heating to melt at 60° C., then adding the emulsifier and the co-emulsifier into the container, treating by a high shear homogenizer at a rotation speed of 5000 revolutions per minute (rpm), rotating for 10 minutes, and adding 60° C. of water into the container, treating by the high shear homogenizer at a rotation speed of 10000 rpm, rotating for 10 minutes, cooling to 40° C., then adding the thickener, the bactericidal insecticide, and the plant nutrient into the container, treating by the high shear homogenizer at the rotation speed of 10000 rpm, and rotating for 30 minutes, to obtain the emulsion in water.

Embodiment 2

This embodiment provides an emulsion in water for preventing and treating a yellow shoot of a citrus fruit tree. Compared with Embodiment 1, a difference is that the plant nutrient is a humic acid containing water-soluble fertilizer, and the humic acid containing water-soluble fertilizer is a commercially available product. For example, the humic acid containing water-soluble fertilizer (agricultural fertilizer (2018) No. 7238) of Zhengzhou Haoda Biotech Co., Ltd. is used in this embodiment.

This embodiment provides an emulsion in water for preventing and treating a yellow shoot of a citrus fruit tree, and it is composed of the following components according to the weight ratio: 200 parts of a dodecanol, 50 parts of a hexadecanol, 30 parts of a bactericidal insecticide, 40 parts of a plant nutrient, 6 parts of an emulsifier, 5 parts of a co-emulsifier, 40 parts of a thickener, and 700 parts of water.

In this embodiment, the bactericidal insecticide is a mixture of tea saponin and azadirachtin, herein the weight ratio of the tea saponin and the azadirachtin is 10:1. The plant nutrient is a humic acid containing water-soluble fertilizer, and the humic acid containing water-soluble fertilizer is a commercially available product. For example, in this embodiment, the humic acid containing water-soluble fertilizer (agricultural fertilizer (2018) No. 7238) of Zhengzhou Haoda Biotech Co., Ltd. is used. The emulsifier is a fatty acid polyoxyethylene ester. The co-emulsifier is an n-butanol. The thickener is a methyl cellulose.

A preparation method for the emulsion in water for preventing and treating the yellow shoot of the citrus fruit tree in this embodiment is the same as that in Embodiment 1.

Embodiment 3

This embodiment provides an emulsion in water for preventing and treating a yellow shoot of a citrus fruit tree, and it is composed of the following components according to the weight ratio: 100 parts of a dodecanol, 2 parts of a hexadecanol, 1 part of a bactericidal insecticide, 5 parts of a plant nutrient, 5 parts of an emulsifier, 4 parts of a co-emulsifier, 40 parts of a thickener, and 500 parts of water.

The bactericidal insecticide in this embodiment is an azadirachtin. The plant nutrient is an amino acid containing water-soluble fertilizer, and the amino acid containing water-soluble fertilizer is a commercially available product. In this embodiment, the amino acid containing water-soluble fertilizer (agricultural fertilizer (2018) No. 12476) produced by Zhuhai Runnong Technology Co., Ltd. is used. The emulsifier is a high-carbon fatty alcohol polyoxyethylene ether. The co-emulsifier is a propylene glycol. The thickener is an attapulgite.

A preparation method for the emulsion in water for preventing and treating the yellow shoot of the citrus fruit tree in this embodiment is the same as that in Embodiment 1.

Embodiment 4

This embodiment provides an emulsion in water for preventing and treating a yellow shoot of a citrus fruit tree, and it is composed of the following components according to the weight ratio: 300 parts of a dodecanol, 150 parts of a hexadecanol, 100 parts of a bactericidal insecticide, 150 parts of a plant nutrient, 10 parts of an emulsifier, 6 parts of a co-emulsifier, 40 parts of a thickener, and 800 parts of water.

The bactericidal insecticide in this embodiment is a tea saponin. The plant nutrient is an amino acid containing water-soluble fertilizer, and the amino acid containing water-soluble fertilizer is a commercially available product. In this embodiment, the amino acid containing water-soluble fertilizer (agricultural fertilizer (2018) No. 12476) produced by Zhuhai Runnong Technology Co., Ltd. is used. The emulsifier is a high-carbon fatty alcohol polyoxyethylene ether. The co-emulsifier is a propylene glycol. The thickener is a methyl cellulose.

A preparation method for the emulsion in water for preventing and treating the yellow shoot of the citrus fruit tree in this embodiment is the same as that in Embodiment 1.

Embodiment 5

This embodiment provides an application method of the emulsion in water for preventing and treating the yellow shoot of the citrus fruit tree. While the emulsion in water for preventing and treating the yellow shoot of the citrus fruit tree prepared in Embodiments 1, 2, 3 or 4 of the present invention is used, the emulsion in water is sprayed on a whole fruit tree (including leaves and trunks) after being diluted by 300 times with water, and the emulsion in water is sprayed on a root of the fruit tree after being diluted by 300 times.

Embodiment 6

As a preferred implementation mode of Embodiment 5, the emulsion in water in which the plant nutrient is the amino acid containing water-soluble fertilizer is sprayed on the whole fruit tree (including leaves and trunks) after being diluted by 300 times with water; and the emulsion in water in which the plant nutrient is the humic acid containing water-soluble fertilizer is sprayed on the root of the fruit tree after being diluted by 300 times with the water.

Embodiment 7

Prevention and treatment test effect of emulsion in water for preventing and treating yellow shoot of citrus fruit tree on Xinhui Chazhi citrus fruit tree Sampling:

Sample A is the emulsion in water for preventing and treating the yellow shoot of the citrus fruit tree prepared in Embodiment 1.

Sample B is the emulsion in water for preventing and treating the yellow shoot of the citrus fruit tree prepared in Embodiment 2.

Sample C is the emulsion in water for preventing and treating the yellow shoot of the citrus fruit tree prepared in Embodiment 3.

Sample D is the emulsion in water for preventing and treating the yellow shoot of the citrus fruit tree prepared in Embodiment 4.

Sample E is abamectin•imidacloprid (manufacturer: Shanghai Nongle Biological Products Co., Ltd. (registration number: PD20141229))

Crop: Xinhui Chazhi citrus

Place: Panli Village, Shuangshui Town, Xinhui District, hangmen City, Guangdong Province Method: 50 Chazhi citrus fruit trees are selected from the same area in a fruit farm, and according to the requirements of an experimental scheme, the fruit trees are treated with root spraying and plant spraying, and the treatment is performed once every 15 days.

TABLE 1

Experimental scheme for preventing and treating yellow shoot of citrus fruit tree

| Serial number | Used sample | Application method |
|---|---|---|
| Experimental group 1 | Samples A and B | 1. Sample A is sprayed on a plant (including leaves and branches) after being diluted by 300 times with water; 2. Sample B is sprayed on a root of a fruit tree after being diluted by 300 times with the water. |
| Experimental group 2 | Sample A | Sample A is only sprayed on the plant (including leaves and branches) after being diluted by 300 times with the water. |
| Experimental group 3 | Sample A | Sample A is sprayed on the plant (including leaves and branches) after being diluted by 300 times with the water, and sprayed on the root of the fruit tree at the same time. |
| Experimental group 4 | Sample B | Sample B is only sprayed on the plant (including leaves and branches) after being diluted by 300 times with the water. |
| Experimental group 5 | Sample B | Sample B is sprayed on the plant (including leaves and branches) after being diluted by 300 times with the water, and sprayed on the root of the fruit tree at the same time. |
| Experimental group 6 | Sample C | Sample C is only sprayed on the plant (including leaves and branches) after being diluted by 300 times with the water. |
| Experimental group 7 | Sample C | Sample C is sprayed on the plant (including leaves and branches) after being diluted by 300 times with the water, and sprayed on the root of the fruit tree at the same time. |

TABLE 1-continued

Experimental scheme for preventing and treating yellow shoot of citrus fruit tree

| Serial number | Used sample | Application method |
|---|---|---|
| Experimental group 8 | Sample D | Sample D is only sprayed on the plant (including leaves and branches) after being diluted by 300 times with the water. |
| Experimental group 9 | Sample D | Sample D is sprayed on the plant (including leaves and branches) after being diluted by 300 times with the water, and sprayed on the root of the fruit tree at the same time. |
| Control group | Sample E | Sample E is sprayed on the plant (including leaves and branches) after being diluted (the dilution ratio is in accordance with the use requirements of Sample E) with the water. |

1. The effects of preventing and treating the yellow shoot are observed on the site, including the spread effect of preventing and treating the yellow shoot (the effect of preventing and treating citrus psylla) and the treatment effect of a diseased tree with the yellow shoot, results are as follows.

TABLE 2

Prevention and treatment effect of emulsion in water for preventing and treating yellow shoot of citrus fruit tree on Xinhui Chazhi citrus

| Serial number | Prevention and treatment effect of citrus psylla (%) | Treatment Effect of yellow shoot diseased tree |
|---|---|---|
| Experimental group 1 | 92.3 | The diseased tree is rejuvenated, the branches are no longer dry, the leaves turn green slowly (except for the original yellow leaves fallen), and 97% of the new grown leaves are normal. |
| Experimental group 2 | 91.1 | The disease of the diseased tree is no longer worsen, some of the branches are no longer dry, some of the leaves turn green slowly, and 75% of the new grown leaves are normal. |
| Experimental group 3 | 90.1 | The disease of the diseased tree is no longer worsen, some of the branches are no longer dry, some of the leaves turn green slowly, and 89% of the new grown leaves are normal. |
| Experimental group 4 | 93.3 | The disease of the diseased tree is no longer worsen, some of the branches are no longer dry, some of the leaves turn green slowly, and 74% of the new grown leaves are normal. |
| Experimental group 5 | 91.1 | The disease of the diseased tree is no longer worsen, some of the branches are no longer dry, some of the leaves turn green slowly, and 92% of the new grown leaves are normal. |
| Experimental group 6 | 88.1 | The disease of the diseased tree is no longer worsen, some of the branches are no longer dry, some of the leaves turn green slowly, and 78% of the new grown leaves are normal. |
| Experimental group 7 | 93.5 | The disease of the diseased tree is no longer worsen, some of the branches are no longer dry, some of the leaves turn green slowly, and 90.2% of the new grown leaves are normal. |
| Experimental group 8 | 91.3 | The disease of the diseased tree is no longer worsen, some of the branches are no longer dry, some of the leaves turn green slowly, and 83% of the new grown leaves are normal. |
| Experimental group 9 | 89.1 | The disease of the diseased tree is no longer worsen, some of the branches are no longer dry, some of the leaves turn green slowly, and 91% of the new grown leaves are normal. |
| Control group | 64.8 | The diseased tree is weaker and weaker, there are more and more dry branches and yellow leaves, and 90% of the new leaves have the diseases. |

A computational formula for the prevention and treatment effect of the citrus psylla is as follows.

$$PT=\left(1-\frac{CK_0\times PT_1}{CK_1\times PT_0}\right)\times 100$$

PT—Prevention and treatment effect, the unit is a percentage (%);

$PT_0$—Number of insects in pesticide treatment area before application, the unit is a head;

$PT_1$—Number of insects in pesticide treatment area after application, the unit is a head;

$CK_0$—Number of live insects in blank control area before application, the unit is a head; and $CK_1$—Number of live insects in blank control area after application, the unit is a head.

It may be seen from Table 2 that while the emulsion in water for preventing and treating the yellow shoot of the citrus fruit tree of the present invention is used to spray on the fruit tree plants, each experimental group has the apparent prevention and treatment effect on the citrus psylla, the propagation path of the yellow shoot is cut off effectively, and the spread of the yellow shoot is reduced. The prevention and treatment effect on the citrus psylla in the experimental group is apparently better than that in the control group using a traditional pesticide; and it is seen from the treatment results of the yellow shoot diseased tree that the root spraying and the plant spraying (performed alone or simultaneously) on the fruit tree may both treat the yellow shoot of the Xinhui Chazhi citrus. After the treatment, the fruit tree recovers the vitality, and the disease gradually disappears. The prevention and treatment effect of the experimental group in which the root spraying and the plant spraying are performed simultaneously is better than that of the experimental group in which the spraying is performed alone, and also significantly better than that of the control group using the traditional pesticide, herein the prevention and treatment effect of Experimental group 1 in which the root spraying and the plant spraying are performed by using different formulations is the best.

2. Samples of diseased tree branches and leaves of Experimental group 1 and control group in different periods are collected on the site, the positive reaction conditions of the samples to phloem bacilli of Asian yellow shoot are analyzed by a nucleic acid molecular detection method (a qualitative test is used for the samples from 2019, Feb. 2, and a quantitative test is used for the samples from other times), to determine the prevention and treatment effect, and results are as follows.

TABLE 3

Pathogenic bacteria detection results of samples of fruit trees in different periods in Experimental group 1

| Serial number | Sample place | Sampling fruit tree number | Sample number | Sampling time: 2019 Dec. 2 Result | Sampling time: 2020 Jan. 26 Result | Sampling time: 2020 Jan. 26 Ct value | Sampling time: 2020 Feb. 23 Result | Sampling time: 2020 Feb. 23 Ct value | Sampling time: 2020 Mar. 15 Result | Sampling time: 2020 Mar. 15 Ct value |
|---|---|---|---|---|---|---|---|---|---|---|
| 1 | 1# base | 1# | 1-1-1 (Old branches and new leaves) | Positive | — | 38.99 | — | 38.47 | — | 38.91 |
| 2 | | 1# | 1-1-2 (Old branches and old leaves) | Positive | Positive | 28.46 | Positive | 33.64 | — | 36.86 |
| 4 | | 2# | 1-2-1 (Old branches and new leaves) | Positive | — | 38.37 | — | 37.42 | — | 37.21 |
| 5 | | 2# | 1-2-2 (Old branches and old leaves) | Positive | — | 37.77 | — | 37.22 | — | 38.1 |
| 6 | | 3# | 1-3 (Old branches and old leaves) | Positive | Positive | 31.72 | Positive | 33.56 | Positive | 35.29 |
| 7 | | 4# | 1-4 (Old branches and new leaves) | Positive | — | 36.21 | — | 37.52 | — | 37.78 |
| 8 | 2# base | 1# | 2-1 (Old branches and old leaves) | Positive | Positive | 34.33 | Positive | 35.06 | — | 37.52 |
| 9 | | 2# | 2-2 (Old branches and old leaves) | Positive | Positive | 33.74 | Positive | 35.46 | Positive | 35.93 |
| 10 | | 3# | 2-3 (Old branches and old leaves) | Positive | — | 37.24 | — | 37.56 | — | 38.22 |

Note:
Judgment standard: Ct value <36, the fruit tree sample has a positive reaction to the pathogenic bacteria of the yellow shoot, the numerical value is smaller, and the disease is more serious.

TABLE 4

Pathogenic bacteria detection results of samples of fruit trees in different periods in control group 1

| Serial number | Sample place | Sampling fruit tree number | Sample number | Sampling time: 2019 Dec. 2 Result | Sampling time: 2020 Jan. 26 Result | Sampling time: 2020 Jan. 26 Ct value | Sampling time: 2020 Feb. 23 Result | Sampling time: 2020 Feb. 23 Ct value | Sampling time: 2020 Mar. 15 Result | Sampling time: 2020 Mar. 15 Ct value |
|---|---|---|---|---|---|---|---|---|---|---|
| 1 | 1# base | 5# | 5-1-1 (Old branches and new leaves) | Positive | Positive | 35.61 | Positive | 35.45 | Positive | 35.10 |
| 2 | | 5# | 5-1-2 (Old | Positive | Positive | 32.12 | Positive | 26.55 | Positive | 26.44 |

TABLE 4-continued

| Pathogenic bacteria detection results of samples of fruit trees in different periods in control group 1 | | | | | | | | | | |
|---|---|---|---|---|---|---|---|---|---|---|
| Serial number | Sample place | Sampling fruit tree number | Sample number | Sampling time: 2019 Dec. 2 Result | Sampling time: 2020 Jan. 26 Result | Ct value | Sampling time: 2020 Feb. 23 Result | Ct value | Sampling time: 2020 Mar. 15 Result | Ct value |
| 3 | | 6# | branches and old leaves) 6-1 (Old branches and new leaves) | Positive | Positive | 35.01 | Positive | 34.37 | Positive | 33.58 |

Note:
Judgment standard: Ct value <36, the fruit tree sample has a positive reaction to the pathogenic bacteria of the yellow shoot, the numerical value is smaller, and the disease is more serious.

It may be seen from Table 3 that the reaction of the fruit trees to the bacilli of Asian yellow shoot in Experiment group 1 in which the root spraying and the spraying are performed simultaneously: as time goes on, the proportion of the positive reaction in the old branches and leaves is continuously decreased, and the Ct value is also continuously increased, approaches or exceeds a threshold value, it is indicated that the pathogenic bacteria in the old branches and leaves of the original diseased tree are slowly decreased, and the fruit tree turns to normal slowly; and after the treatment, the pathogenic bacteria are not detected in branch and leaf portions with new grown leaves (including old branches and new leaves), it is indicated that there are no bacteria in the roots, trunks and branches with the new grown leaves of the fruit tree. The fruit tree recovers the vitality, and belongs to the normal fruit tree.

It may be seen from Table 4 that the fruit trees in the control group with the conventional treatment always show the positive reaction to the pathogenic bacteria detection of the yellow shoot, and the Ct value has a downward trend, it is indicated that there are more and more pathogenic bacteria of the yellow shoot, and the disease of the fruit tree is more and more serious.

It may be seen from the above that the emulsion in water for preventing and treating the yellow shoot of the citrus fruit tree provided in this embodiment may effectively prevent and treat the citrus yellow shoot, herein it is the best scheme to use the different formulations (Experimental group 1) to perform the root spraying and the plant spraying on the fruit tree simultaneously.

Embodiment 8

Prevention and treatment test effect of emulsion in water for preventing and treating yellow shoot of citrus fruit tree on Xinhui Chazhi citrus fruit tree Sampling:

Sample A is the emulsion in water for preventing and treating the yellow shoot of the citrus fruit tree prepared in Embodiment 1.

Sample B is the emulsion in water for preventing and treating the yellow shoot of the citrus fruit tree prepared in Embodiment 2.

Sample E is abamectin•imidacloprid (manufacturer: Shanghai Nongle Biological Products Co., Ltd. (registration number: PD20141229))

Sample F is the photosynthetic high-fat film agent in Embodiment 1 of CN109924057A Crop: Xinhui Chazhi citrus Place: Panli Village, Shuangshui Town, Xinhui District, hangmen City, Guangdong Province Method: 10 Chazhi citrus fruit trees are selected from the same area in a fruit farm, and according to the requirements of an experimental scheme, the fruit trees are treated with root spraying and plant spraying respectively.

TABLE 5

| Experimental scheme for preventing and treating yellow shoot of citrus fruit tree | | |
|---|---|---|
| Serial number | Used sample | Application method |
| Experimental group 11 | Samples A and B | 1. Sample A is sprayed on a plant (including leaves and branches) after being diluted by 300 times with water; 2. Sample B is sprayed on a root of a fruit tree after being diluted by 300 times with the water, and the treatment is performed once every 15 days. |
| Control group 11 | Sample E | Sample E is sprayed on the plant (including leaves and branches) after being diluted (the dilution ratio is in accordance with the use requirements of Sample E) with the water, and the treatment is performed once every 15 days. |
| Control group 21 | Sample E | Sample E is sprayed on the plant (including leaves and branches) after being diluted (the dilution ratio is in accordance with the use requirements of Sample E) with the water, and sprayed on the root of the fruit tree at the same time, and the treatment is performed once every 15 days. |
| Control group 31 | Sample F | Sample F is sprayed on the plant (including leaves and branches) after being diluted (the dilution ratio is in accordance with the use requirements of Sample F) with the water, and the treatment is performed once every 15 days. |
| Control group 41 | Sample F | Sample F is sprayed on the plant (including leaves and branches) after being diluted (the dilution ratio is in accordance with the use requirements of Sample F) with the water, and sprayed on the root of the fruit tree at the same time, and the treatment is performed once every 15 days. |

TABLE 5-continued

| Experimental scheme for preventing and treating yellow shoot of citrus fruit tree | | |
|---|---|---|
| Serial number | Used sample | Application method |
| Control group 51 | Sample F | Sample F is sprayed on the plant (including leaves and branches) after being diluted (the dilution ratio is in accordance with the use requirements of Sample F) with the water, and the treatment is performed once every 7 days. |
| Control group 61 | Sample F | Sample F is sprayed on the plant (including leaves and branches) after being diluted (the dilution ratio is in accordance with the use requirements of Sample F) with the water, and sprayed on the root of the fruit tree at the same time, and the treatment is performed once every 7 days. |

1. The effects of preventing and treating the yellow shoot are observed on the site, including the spread effect of preventing and treating the yellow shoot (the effect of preventing and treating citrus psylla) and the treatment effect of a diseased tree with the yellow shoot, results are as follows.

TABLE 6

| Prevention and treatment effect of emulsion in water for preventing and treating yellow shoot of citrus fruit tree on Xinhui Chazhi citrus | | |
|---|---|---|
| Serial number | Prevention and treatment effect of citrus psylla (%) | Treatment Effect of yellow shoot diseased tree |
| Experimental group 11 | 89.5 | The diseased tree is rejuvenated, the branches are no longer dry, the leaves turn green slowly (except for the original yellow leaves fallen), and 97% of the new grown leaves are normal. |
| Control group 11 | 62.5 | The diseased tree is weaker and weaker, there are more and more dry branches and yellow leaves, and 90% of the new leaves have the diseases. |
| Control group 21 | 64.8 | The diseased tree is weaker and weaker, there are more and more dry branches and yellow leaves, and 87% of the new leaves have the diseases. |

TABLE 6-continued

| Prevention and treatment effect of emulsion in water for preventing and treating yellow shoot of citrus fruit tree on Xinhui Chazhi citrus | | |
|---|---|---|
| Serial number | Prevention and treatment effect of citrus psylla (%) | Treatment Effect of yellow shoot diseased tree |
| Control group 31 | 88.3 | The diseased tree is rejuvenated, the branches are no longer dry, the leaves turn green slowly (except for the original yellow leaves fallen), and 76% of the new grown leaves are normal. |
| Control group 41 | 88.6 | The diseased tree is rejuvenated, the branches are no longer dry, the leaves turn green slowly (except for the original yellow leaves fallen), and 78% of the new grown leaves are normal. |
| Control group 51 | 90.4 | The diseased tree is rejuvenated, the branches are no longer dry, the leaves turn green slowly (except for the original yellow leaves fallen), and 81% of the new grown leaves are normal. |
| Control group 61 | 90.2 | The diseased tree is rejuvenated, the branches are no longer dry, the leaves turn green slowly (except for the originalyellow leaves fallen), and 83% of the new grown leaves are normal. |

Brief summary obtained from the data in Table 6: the emulsion in water for preventing and treating the yellow shoot of the citrus fruit tree of the present invention is used to treat the fruit tree, it has the apparent prevention and control effect on the citrus psylla, and may also treat the yellow shoot of the Xinhui Chazhi citrus, the fruit tree recovers the vitality after the treatment, and the disease slowly disappears; and the emulsion in water of CN109924057A is used to treat the fruit tree, it has the apparent prevention and control effect on the citrus psylla, and has a certain effect on the treatment of the yellow shoot of the Xinhui Chazhi citrus, but the treatment effect is apparently worse than that of the test group in this scheme, and even if the use interval is shortened, the treatment effect of this scheme may not be achieved.

2. Samples of diseased tree branches and leaves of the experimental group and the control group in different periods are collected respectively on the site, the positive reaction conditions of the samples to phloem bacilli of Asian yellow shoot are analyzed by a nucleic acid molecular detection method, to determine the prevention and treatment effect, and results are as follows.

TABLE 7

| Pathogenic bacteria detection results of samples of fruit trees in different periods in experimental group and control group | | | | | | | | |
|---|---|---|---|---|---|---|---|---|
| | | Sampling | Sampling time: 2020 Jun. 17 | | Sampling time: 2020 Jul. 16 | | Sampling time: 2020 Aug. 18 | |
| Serial number | Group | fruit tree number | Result | Ct value | Result | Ct value | Result | Ct value |
| 1 | Experimental group 11 | TR11-1# | Positive | 28.99 | — | 38.47 | — | 39.91 |
| 2 | Control group 11 | CK11-1# | Positive | 32.46 | Positive | 28.64 | Positive | 26.86 |
| 4 | Control group 21 | CK21-2# | Positive | 33.37 | Positive | 31.42 | Positive | 27.21 |

TABLE 7-continued

Pathogenic bacteria detection results of samples of fruit trees in different periods in experimental group and control group

| Serial number | Group | Sampling fruit tree number | Sampling time: 2020 Jun. 17 Result | Ct value | Sampling time: 2020 Jul. 16 Result | Ct value | Sampling time: 2020 Aug. 18 Result | Ct value |
|---|---|---|---|---|---|---|---|---|
| 5 | Control group 31 | CK31-4# | Positive | 31.77 | Positive | 34.56 | Positive | 35.29 |
| 6 | Control group 41 | CK41-6# | Positive | 31.72 | Positive | 35.56 | — | 37.29 |
| 7 | Control group 51 | CK51-2# | Positive | 33.21 | Positive | 35.52 | — | 37.78 |
| 8 | Control group 61 | CK61-3# | Positive | 34.33 | — | 36.06 | — | 37.52 |

Note:
judgment standard: Ct value <36, the fruit tree sample has a positive reaction to pathogenic bacteria of the yellow shoot, the numerical value is smaller, and the disease is more serious.

It may be seen from the table that the emulsion in water for preventing and treating the yellow shoot of the citrus fruit tree of the present invention is used to treat the fruit tree, the proportion of the positive reactions in the branches and leaves is continuously decreased, it is indicated that the pathogenic bacteria in the old branches and leaves of the original diseased tree are slowly decreased, and the fruit tree also slowly turns to normal; and while the emulsion in water of CN109924057A is used to treat the fruit tree, the decrease of the pathogenic bacteria is not as apparent as that of the test group.

In the present application, the film agent, containing the "higher fatty alcohol, bactericidal insecticide, and plant nutrient", for preventing and treating the citrus yellow shoot is used to treat the fruit tree with the yellow shoot. On the one hand, the inventor discovers the action mechanism of the physiological activity of fatty alcohol substances on plants by the subsequent in-depth research and using an omics technology, the fatty alcohol attached to the plant surface may steadily induce the plant physiology in stages and significantly increase the content of signal substances lysophosphatidylcholine and lysophosphatidylethanolamine in the fruit tree, the transcriptional level of a gene related to anabolism and the content of a corresponding substance in the anti-disease and anti-stress phenylpropane pathway, and significantly improves and stabilizes the autoimmunity of the fruit tree. On the other hand, the bactericidal insecticide kills the pathogenic bacteria, and the plant nutrient increases the nutrition of the fruit tree, thereby the prevention and treatment of autoimmune diseases caused by such pathogenic bacteria of the citrus yellow shoot are comprehensively achieved.

Embodiment 9

The influence of the hexadecanol content in the present application on the effect of the present invention: the hexadecanol content in the formula is adjusted, and the influence of the different hexadecanol contents on the water absorption and softening of the film is observed.

Other components in the formula: 100 parts of a dodecanol, 8 parts of an emulsifier, 5 parts of a co-emulsifier, and 50 parts of a thickener The hexadecanol contents are respectively: 200 parts, 150 parts, 100 parts, and 50 parts Method: a sample is prepared according to the formula, it is diluted by 300 times with water, diluents with the same size are dripped onto a glass slide, water is evaporated to form a film, the size of the film is observed with a microscope, the film is scratched, the glass slide is placed in a dew simulator and dew is absorbed by the film, and the film and scratch conditions are observed with the microscope.

| Item | Hexadecanol content (parts) 200 | 150 | 100 | 50 |
|---|---|---|---|---|
| Diameter of droplet film spot on glass slide (cm) | 2.35 | 2.73 | 2.86 | 2.90 |
| Diameter of droplet film spot on glass slide after absorbing dew (cm) | 2.37 | 2.78 | 2.92 | 2.96 |
| Scratch change of droplet film spot on glass slide after absorbing dew | Scratches are re-covered by the film, and the thickness is about 30% of other portions | Scratches are re-covered by the film, and the thickness is about 80% of other portions | Scratches are re-covered by the film, and the thickness is about 96% of other portions | Scratches are re-covered by the film, and the thickness is about 97% of other portions |

The film formed after the emulsion in water in the present application is sprayed on the surface of the fruit tree must have the sufficient water absorption and softening properties, so that the fruit tree may fully absorb the effective ingredients such as the dodecanol, the bactericidal insecticide and the plant nutrient in the film, to achieve the prevention and treatment effect. The hexadecanol in the formula is a basic factor affecting the water absorption and softening properties of the film. The melting point of the hexadecanol is 46~52° C., its content is higher, the film formed is harder, and it is more difficult to absorb water and soften.

It may be seen from the above data that, with the decrease of the hexadecanol content in the formula, the film formed by droplets with the same size on the glass slide is larger, and the film scratches are easier to repair after absorbing the dew, it is indicated that the reduction of the hexadecanol content is beneficial to the water absorption and softening of the film.

In the patent application with the publication number of CN109924057A, the higher content of the hexadecanol is added, and the film has the physical isolation function, to prevent and control the spread of pathogenic bacteria of the yellow shoot. Therefore, the film formed must be hard enough, to prevent the pathogenic bacteria from spreading to a healthy fruit tree after being bitten by psylla; and the present application mainly considers the water absorption and softening properties of the film, so that the fruit tree may absorb the effective ingredients, improve the function of the plant immune system and absorb the bactericidal and nutritional ingredients to directly inhibit and kill the pathogenic bacteria.

Embodiment 10

The influence of the thickener content of the present application on the effect of the present invention: the thickener content in the formula is adjusted, and the influence of the different contents on the water absorption and softening of the film is observed.

Other components in the formula: 100 parts of a dodecanol, 150 parts of a hexadecanol, 8 parts of an emulsifier, and 5 parts of a co-emulsifier The thickener contents are respectively: 50 parts, 45 parts, 40 parts, and 35 parts.

The method is the same as that in Embodiment 14, and test results are as follows:

| | Thickener content (parts) | | | |
|---|---|---|---|---|
| Item | 50 | 45 | 40 | 35 |
| Diameter of droplet film spot on glass slide (cm) | 2.71 | 2.76 | 2.88 | 2.90 |
| Diameter of droplet film spot on glass slide after absorbing dew (cm) | 2.76 | 2.83 | 2.96 | 2.99 |
| Scratch change of droplet film spot on glass slide after absorbing dew | Scratches are re-covered by the film, and the thickness is about 80% of other portions | Scratches are re-covered by the film, and the thickness is about 90% of other portions | Scratches are re-covered by the film, and the thickness is about 96% of other portions | Scratches are re-covered by the film, and the thickness is about 98% of other portions |

It may be seen from the above data that the reduction of the thickener content in the formula is beneficial to the water absorption and softening of the film.

The requirements of the prevention and treatment of the yellow shoot are comprehensively considered, and the hexadecanol and thickener in the formula are appropriately reduced.

Embodiment 16

The formula for prevention and treatment of citrus yellow shoot includes three main raw materials: a higher fatty alcohol, a bactericidal insecticide, and a plant nutrient. The organic combination of the three effective ingredients may effectively and efficiently prevent and treat the yellow shoot. In this experiment, three types of the raw materials are selected for single use, and different combinations are compounded for use to test the effects. The missing portion of the raw materials is supplemented with water, and the three types of the raw materials are marked as follows:

Raw material A: the higher fatty alcohol is 12-alcohol: 16-alcohol=9:1;

Raw material B: the bactericidal insecticide is a tea saponin;

Raw material C: the plant nutrient is an amino acid containing water-soluble fertilizer.

Component composition: 250 parts of the raw material A, 30 parts of the raw material B, 40 parts of the raw material C, 6 parts of an emulsifier, 5 parts of a co-emulsifier, 40 parts of a thickener, and 700 parts of the water.

The corresponding film agent is prepared with the different combinations of the three main raw materials (one, two and three), and the missing portion of the raw materials is supplemented with the water.

In a fruit farm of Panli Village, Shuangshui Town, Xinhui District, Jiangmen City, Guangdong Province, 5 Chazhi citrus fruit trees with the apparent yellow shoot are selected from the same area, and different film agents are diluted by 300 times with the water to perform root spraying and plant spraying on the fruit trees. The treatment is performed once every 15 days and three times, and the use effect is observed.

| Serial number | Used raw material | Treatment Effect of yellow shoot diseased tree |
|---|---|---|
| Experimental group 1 | A | The diseased tree is rejuvenated, the branches are no longer dry, the leaves turn green slowly (except for the original yellow leaves fallen), and 83% of the new grown leaves are normal. |

-continued

| Serial number | Used raw material | Treatment Effect of yellow shoot diseased tree |
|---|---|---|
| Experimental group 2 | B | The fruit tree has the apparent yellow shoot symptoms, the dry branches and yellow leaves are increased, and 85% of the new leaves have the disease. |
| Experimental group 3 | C | The fruit tree has the apparent yellow shoot symptoms, the dry branches and |

-continued

| Serial number | Used raw material | Treatment Effect of yellow shoot diseased tree |
|---|---|---|
| | | yellow leaves are increased, and 78% of the new leaves have the disease. |
| Experimental group 4 | A + B | The disease of the diseased tree is no longer worsen, some of the branches are no longer dry, some of the leaves turn green slowly, and 89% of the new grown leaves are normal. |
| Experimental group 5 | A + C | The disease of the diseased tree is no longer worsen, some of the branches are no longer dry, some of the leaves turn green slowly, and 92% of the new grown leaves are normal. |
| Experimental group 6 | B + C | The fruit tree has the yellow shoot symptoms, the dry branches and yellow leaves are increased, and 70% of the new leaves have the disease. |
| Experimental group 7 | A + B + C | The diseased tree is rejuvenated, the branches are no longer dry, the leaves turn green slowly (except for the original yellow leaves fallen), and 97% of the new grown leaves are normal. |

It is seen from the treatment results of the yellow shoot diseased trees that the applications, the root spraying and the plant spraying on the fruit trees, of the film agents of which the raw materials contain the higher fatty alcohol (alone, two combinations or three combinations) may all cure the yellow shoot of the Xinhui Chazhi citrus. After the treatment, the fruit tree recovers the vitality, and the disease gradually disappears. The prevention and treatment effect of the experimental group containing the combination of three raw materials is better than that of other experimental groups. The film agent of which the raw material uses only or in combination with the bactericidal insecticide and the plant nutrient does not have a very ideal prevention and treatment effect.

The above are only preferred embodiments of the present invention, and are not intended to limit the present invention. For those skilled in the art, the present invention may have various changes and variations. Any modifications, equivalent replacements, improvements and the like made within the spirit and principle of the present invention shall be included in the scope of protection of the present invention.

What is claimed is:

1. An emulsion in water for preventing and treating a yellow shoot of a citrus fruit tree, wherein it is composed of the following components according to the weight ratio: 200 parts of a dodecanol, 50 parts of a hexadecanol, 30 parts of a bactericidal insecticide, 40 parts of a plant nutrient, 6 parts of an emulsifier, 5 parts of a co-emulsifier, 40 parts of a thickener, and 700 parts of water; wherein the bactericidal insecticide is a combination of tea saponin and azadirachtin with a weight ratio of the tea saponin to the azadirachtin being 10:1, and the plant nutrient is an amino acid containing water-soluble fertilizer or a humic acid containing water-soluble fertilizer.

2. The emulsion in water for preventing and treating the yellow shoot of the citrus fruit tree according to claim 1, wherein the emulsifier is a non-ionic surfactant, and the non-ionic surfactant is at least one of a high-carbon fatty alcohol polyoxyethylene ether, a fatty acid polyoxyethylene ester and a dehydrated sorbitol ester.

3. The emulsion in water for preventing and treating the yellow shoot of the citrus fruit tree according to claim 1, wherein the co-emulsifier is an n-butanol or a propylene glycol.

4. The emulsion in water for preventing and treating the yellow shoot of the citrus fruit tree according to claim 1, wherein the thickener is at least one of an arabic gum, a methyl cellulose, an xanthan gum, a white carbon black, an attapulgite and a bentonite.

5. A preparation method for the emulsion in water for preventing and treating the yellow shoot of the citrus fruit tree according to claim 1, comprising the following steps: putting the dodecanol and the hexadecanol into a container and heating to melt at 60-70° C., then adding the emulsifier and the co-emulsifier into the container, treating by a high shear homogenizer at a rotation speed of 5000 revolutions per minute (rpm), rotating for 10 minutes, and adding 60-70° C. of water into the container, treating by the high shear homogenizer at a rotation speed of 10000 rpm, rotating for 10 minutes, cooling to 40° C., then adding the thickener, the bactericidal insecticide, and the plant nutrient into the container, treating by the high shear homogenizer at the rotation speed of 10000 rpm, and rotating for 30-40 minutes, to obtain the emulsion in water.

6. A method for preventing and treating a yellow shoot of a citrus fruit tree, comprising applying the emulsion in water according to claim 1, wherein after the emulsion in water is diluted by 300 times with the water, it is sprayed on a whole fruit tree plant, and at the same time, the emulsion in water is sprayed on a root of the fruit tree after being diluted by 300 times.

7. A method for preventing and treating a yellow shoot of a citrus fruit tree, comprising applying the emulsion in water according to claim 1, wherein after the emulsion in water in which the plant nutrient is the amino acid containing water-soluble fertilizer is diluted by 300 times with the water, it is sprayed on the whole fruit tree plant; and after the emulsion in water in which the plant nutrient is the humic acid containing water-soluble fertilizer is diluted by 300 times with the water, it is sprayed on the root of the fruit tree.

* * * * *